United States Patent [19]

Kress et al.

[11] 4,423,989
[45] Jan. 3, 1984

[54] MACHINE TOOL ASSEMBLY WITH ROTATABLE CUTTING TOOL

[75] Inventors: Dieter Kress, Aalen; Friedrich Häberle, Lauchheim, both of Fed. Rep. of Germany

[73] Assignee: Mapal Fabrik für Präzisionswerkzeuge Dr. Kress AG, Aalen, Fed. Rep. of Germany

[21] Appl. No.: 272,544

[22] Filed: Jun. 11, 1981

[30] Foreign Application Priority Data

Jun. 12, 1980 [DE] Fed. Rep. of Germany ....... 3022104

[51] Int. Cl.³ .................... B23D 77/06; B23G 39/00; B23P 77/06
[52] U.S. Cl. ................... 408/197; 408/146
[58] Field of Search ............. 408/59, 144, 146, 186, 408/187, 188, 190, 192, 197, 238, 239, 240, 713; 407/48, 90, 98, 103, 110, 112; 30/317, 339, 340, 342

[56] References Cited

U.S. PATENT DOCUMENTS

| | | | |
|---|---|---|---|
| 1,740,604 | 5/1927 | Kienzl | 407/90 |
| 1,779,074 | 10/1930 | Orgood | 408/188 |
| 2,346,084 | 4/1944 | Sanocki | 407/86 |
| 2,374,879 | 5/1945 | Montgomery | 407/86 |
| 2,513,586 | 7/1950 | Rebmann | 407/90 |
| 3,597,104 | 8/1971 | Salcumbe | 408/188 |
| 3,966,347 | 6/1976 | Watson | 408/147 |
| 4,344,724 | 8/1982 | Kress et al. | 408/146 |

FOREIGN PATENT DOCUMENTS

| | | | |
|---|---|---|---|
| 1280479 | 11/1961 | France | 408/188 |
| 1218752 | 1/1971 | United Kingdom | 408/188 |

*Primary Examiner*—E. R. Kazenske
*Assistant Examiner*—Paul M. Heyrana, Sr.
*Attorney, Agent, or Firm*—Toren, McGeady and Stanger

[57] ABSTRACT

A machine tool assembly formed as a shaft member having a cutter head assembly at an end thereof includes a pair of juxtaposed jaws defining a slot therebetween within which there is received a rotatable cutting tool. A T-shaped insert provided in the slot defines abutment surfaces for supporting and guiding the rotatable cutting tool, the T-shaped insert having a projection engaging into a transverse groove formed on the periphery of the rotatable cutting tool and a leg engaging into an axial bore of the shaft member, the leg abutting against a round key member located within a radial bore and adjustably engaged by a screw.

3 Claims, 3 Drawing Figures

MACHINE TOOL ASSEMBLY WITH ROTATABLE CUTTING TOOL

The present invention relates generally to rotary cutting tools and more particularly to a machine tool assembly wherein the cutter head has a rotatable cutter plate reversibly mounted between a pair of juxtaposed jaws at the end of the shaft of the tool.

Tools of the type to which the present invention relates are disclosed, for example, in German Auslegeschrift No. 25 39 855.

In machine cutting tools of this type, abutment surfaces serving to support the nonengaged cutting edges of the cutter plate cannot reliably guarantee centering of the cutter plate when the angle formed by the abutment surfaces does not coincide exactly with the angle formed by the clearance surfaces—that is the surface behind a cutting edge—of two adjacent cutting edges of the plate or when it is deliberately selected to be smaller than the angle formed by the clearance surfaces.

An exact centering of the rotatable cutter plate presents difficulties especially when such a rotatable cutter plate is formed with four circular arc sections of approximately 90° each and when the abutment surfaces are correspondingly shaped in a curved manner. The danger of rotation of the rotatable cutter plate about the axis of a clamp bolt which presses the clamping jaws against the rotatable cutter plate exists especially when the rotatable cutter plate is formed as a circular plate.

The present invention is principally directed toward the task of enabling achievement of an exact centering of the rotatable cutter plate in machine cutting tools of the type previously mentioned in a manner which enables stable support of the cutter plate and firm locking engagement thereof with improved accuracy.

SUMMARY OF THE INVENTION

Briefly, the present invention may be described as a machine tool assembly comprising a shaft member having a cutter head assembly at an end thereof, said cutter head assembly comprising a pair of juxtaposed jaws defining a slot therebetween, a rotatable cutter plate mounted in the slot between said jaws, the cutter plate including transverse groove means provided at the periphery thereof, a clamping bolt extending through the cutter plate having a head abutting against an annular shoulder of a bore of one of the jaws and threads engaging into the other of the jaws, a T-shaped insert having a pair of arms and a leg inserted into the slot, an axial bore formed in the shaft member receiving therein the leg of the T-shaped insert with the arms thereof being located within the slot, a pair of axially symmetrically constructed slanted abutment surfaces formed on the arms of the T-shaped insert and a protuberance formed on the arms of the T-shaped insert arranged to engage into the transverse groove means of the cutter plate.

The cutter plate may be formed with a plurality of arcuate cutting surfaces resp. edges arranged circumferentially thereof and the transverse groove means may comprise a plurality of transverse grooves located between pairs of the arcuate cutting surfaces resp. edges. In order that a tool of this type may function as a solid bit i.e. as a tool boring a hole in the solid, one of the two engaged cutting edges must extend exactly to the axis of the cutter head so that the narrow transverse groove provided at the periphery of the cutter plate intended for receiving the protuberance or fixing cam must be arranged so as to be off-center. The cutter plate will normally include four cutting edges which thus extend over an angle which is smaller than 90° by an angular width equivalent to the width of the transverse groove. The protuberance of the T-shaped insert being arranged so as to be off-center to an extent such that one of the two engaged cutting edges will extend exactly to the middle axis of the cutter head.

In order to be able to press the two arms or sides of the T-shaped insert which form the abutment surfaces with sufficient pressure against the two clearance surfaces of the nonengaged cutting edges, there is arranged in a radial bore of the cutter head shaft a key bolt abutting against a rearward front surface of the leg of the insert, said key bolt being adjustable by means of an adjustment screw.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
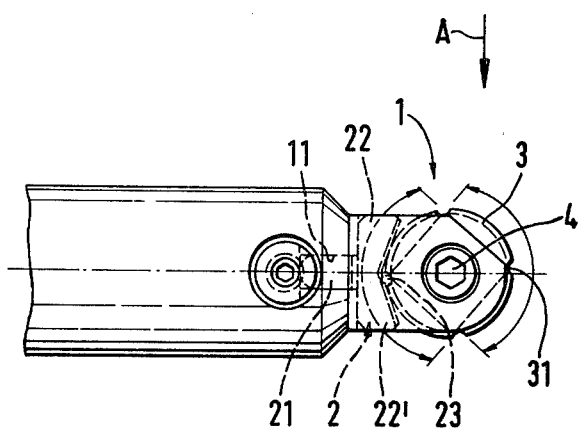
FIG. 1 is a side view of the cutter head assembly of the invention.
Figure 2:
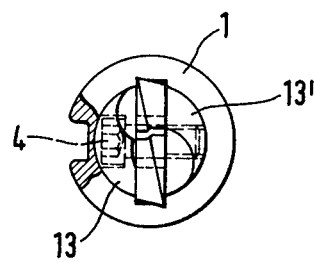
FIG. 2 is a front view of the cutter head assembly.
Figure 3:
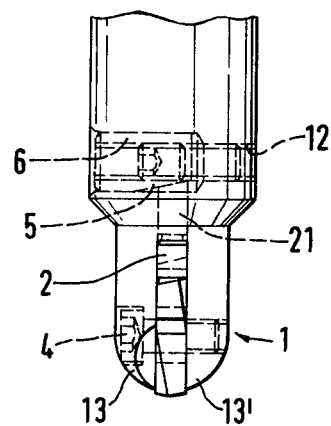
FIG. 3 is a side view of the cutter head assembly as seen in the direction of arrow A of FIG. 1.

Referring now to the drawings, wherein similar parts are identified with like reference numerals in each of the figures thereof, there is shown a machine tool assembly having a shaft end shown to the left in FIG. 1 with a cutter head assembly 1 formed to include a pair of clamping jaws 13 and 13'. Mounted between the clamping jaws 13 and 13' is a turnover or reversible cutter plate 3. The tool assembly includes a T-shaped insert 2 which includes a pair of arms or sides 22, 22' and a cylindrical leg 21. The cutter head assembly 1 is formed to include a front-side axial bore 11 which is arranged so that a radial bore 12 also formed in the machine tool assembly leads into the bore 11. The T-shaped insert 2 is located between the clamping jaws 13, 13' and the sides or arms 22, 22' thereof are formed to serve as abutments for the cutter or turnover plate 3 with the insert 2 arranged with its cylindrical leg 21 engaged in the axial bore 11.

The T-shaped insert 2 is provided with a projection or protuberance 23 in such a manner that the inner flank of this projection is situated in the axis plane which is perpendicular to the clamping jaws 13 and 13'. This projection 23 engages in one of four transverse grooves 31 provided on the periphery of the turnover plate 3 and thus fixes the turnover plate against pivoting around the axis of a clamping screw 4 which traverses the turnover plate and clamps it between the two clamping jaws 13 and 13'.

In order to exert a sufficient pressure of the abutment surfaces formed by the arms 22 and 22' of the T-shaped insert onto the turnover plate, there is arranged in the radial bore 12 of the shaft of the cutter head 1 a key bolt 5 which abuts against the rearward front surface of the cylindrical leg 21 of the insert 2. An adjustment screw 6 is provided for the key bolt 5.

The clamping screw 4 is arranged with its head abutting against an annular shoulder of a bore which extends through one of the clamping jaws 13, 13', with the opposite end of the clamping screw 4 being threadedly engaged with the other of the jaws 13, 13'.

The turnover plate 3 is formed with four circular arc-shaped curved cutter surfaces arranged symmetrically relative to its middle axis and the grooves 31 are provided between each of the curved cutter surfaces resp. cutting edges.

The projection 23 and groove 31 receiving the projection 23 are arranged outside of the cutter head axis.

While a specific embodiment of the invention has been shown and described in detail to illustrate the application of the inventive principles, it will be understood that the invention may be embodied otherwise without departing from such principles.

What is claimed is:

1. A machine tool assembly having a generally centrally located longitudinal axis about which said assembly is rotated to perform a cutting operation including a shaft member having a cutter head assembly at an end thereof, said cutter head assembly comprising:

a pair of juxtaposed jaws defining a slot therebetween;

a rotatable cutter plate mounted in said slot between said jaws, said cutter plate including transverse groove means provided at the periphery thereof;

a clamping bolt extending through said cutter plate having a head abutting against an annular shoulder of a bore of one of said jaws and threads engaging into the other of said jaws;

a T-shaped insert having a pair of arms and a leg inserted into said slot;

an axial bore formed in said shaft member receiving therein said leg of said T-shaped insert with said arms thereof being located in said slot; and a pair of axially symmetrically constructed slanted abutment surfaces formed on said arms of said T-shaped insert and a protuberance formed on said arms of said T-shaped insert arranged to engage into said transverse groove means of said cutter plate to rotatively lock said cutter place in place;

said protuberance and said transverse groove means receiving said protuberance being arranged laterally offset so as to be located completely outside of the path of said longitudinal axis.

2. An assembly according to claim 1 further including a radial bore leading to said axial bore and a key bolt arranged in said radial bore with a screw being provided for adjustment of said key bolt.

3. An assembly according to claim 1 wherein said cutter plate is formed as a generally circular member having four circular arc-shaped curved cutter surfaces arranged symmetrically relative to its center axis, said transverse groove means including at least two grooves arranged diagonally opposite each other between two of said cutter surfaces.

* * * * *